United States Patent [11] 3,610,858

| [72] | Inventors | Lothar Gruber<br>Mannheim-Seckenheim;<br>Wolfgang Schmitz, Birkenau, both of<br>Germany |
|---|---|---|
| [21] | Appl. No. | 764,446 |
| [22] | Filed | Oct. 2, 1968 |
| [45] | Patented | Oct. 5, 1971 |
| [73] | Assignee | Brown, Boveri & Cie Aktiengesellschaft<br>Mannheim-Kafertal, Germany |
| [32] | Priority | Oct. 3, 1967 |
| [33] | | Germany |
| [31] | | P 16 15 598.5 |

[54] DISCONNECTING DEVICE FOR FULLY INSULATED HIGH-VOLTAGE ELECTRICAL SWITCHGEAR WITH INDIVIDUALLY RECIPROCAL CONTACTS
10 Claims, 1 Drawing Fig.

[52] U.S. Cl. .......... 200/163, 200/48 R, 200/148 B
[51] Int. Cl. ............................ H01h 31/24, H01h 3/46
[50] Field of Search........................ 200/163, 148, 148 B, 148 D, 48 R; 174/6, 7

[56] References Cited
UNITED STATES PATENTS

| 3,485,971 | 12/1969 | Boersma et al. .............. | 200/48 |
| 3,356,798 | 12/1967 | McKinnon..................... | 200/148 X |

FOREIGN PATENTS

| 1,047,903 | 12/1958 | Germany...................... | 200/48 |
| 1,356,752 | 2/1964 | France ......................... | 200/148 |
| 1,000,902 | 1/1957 | Germany...................... | 200/148 (.4) |
| 1,073,218 | 6/1967 | Great Britain................ | 200/148 (.2) |
| 833,559 | 4/1960 | Great Britain................ | 200/148 (.2) |
| 361,319 | 5/1962 | Switzerland.................. | 200/148 (.2) |
| 385,955 | 3/1965 | Switzerland.................. | 200/148 (.2) |

*Primary Examiner*—Robert K. Schaefer
*Assistant Examiner*—Robert A. Vanderhye
*Attorney*—Wilfond, Lerner and Tick

ABSTRACT: Disconnecting device for fully insulated high-voltage electrical switchgear includes an electrically conductive middle portion and a pair of contact members located in said middle portion and electrically connected in series with one another, the contact members being displaceable individually through a partial disconnect gap into and out of a disconnect position so as to respectively break and make electrical contact with an adjacent electrical contact member.

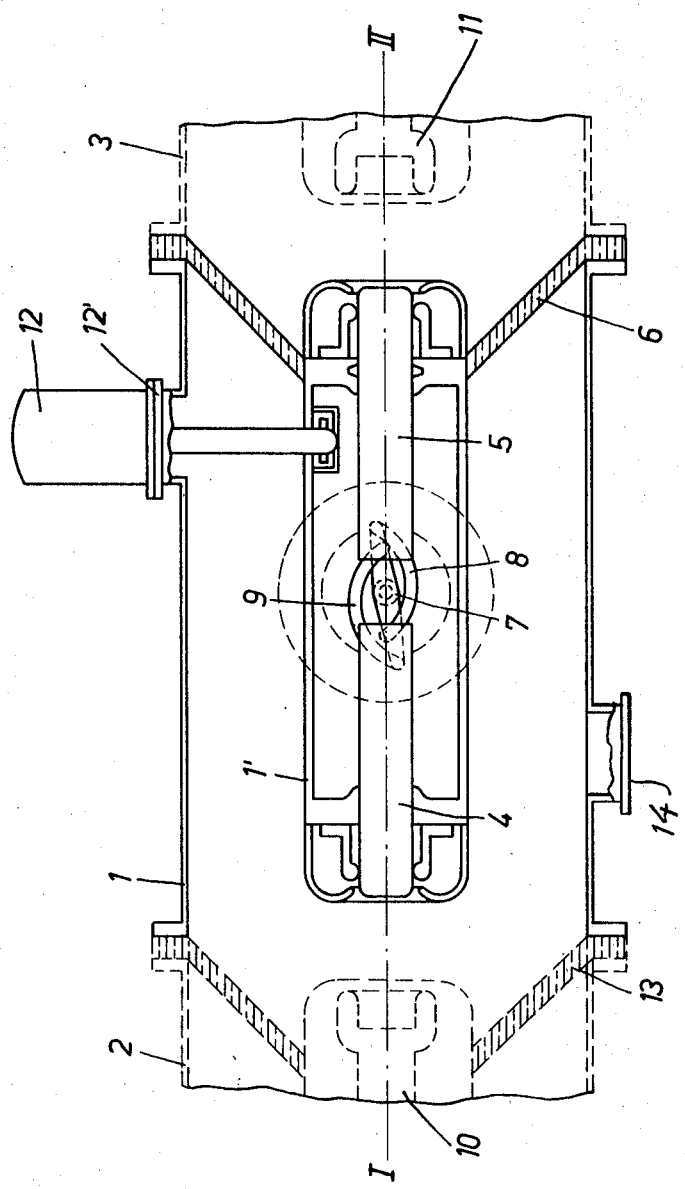

"3,610,858"

DISCONNECTING DEVICE FOR FULLY INSULATED HIGH-VOLTAGE ELECTRICAL SWITCHGEAR WITH INDIVIDUALLY RECIPROCAL CONTACTS

Our invention relates to a disconnecting device for fully insulated high-voltage electrical switchgear.

Amongst such high-voltage switchgear are those wherein components subjected to voltage are surrounded by an insulating medium, such as compressed gas or molding resin, for example, which borders directly on a conductive casing connected to ground potential. For the most part, this conductive casing is made in the shape of a tubular container.

The disconnecting devices of such gear frequently have two partial disconnect lengths arranged electrically in series and combined in a double disconnect location in a central portion of the device. Each of the partial disconnect lengths is rated for the entire insulation voltage, and the central portion of the disconnecting device can be grounded. Regarding such known devices, reference can be had, for example to German Published Application No. 1,130,494 and to the German publication Calor-Emag-Mitteilungen II/II 1966, page 11, FIG. 7. An important advantage of these double disconnect lengths is that the well-known requirements of the electrical standards established by private or governmental bodies regarding the grounding of disconnect lengths can be fulfilled in a relatively simple manner by grounding the central portion of the double disconnnect length.

It is an object of our invention to provide disconnecting device for fully insulated high-voltage electrical switchgear which is considerably improved over the switchgear of the hereinbefore-mentioned known type, and which renders them serviceable for further switching possibilities.

With the foregoing and other objects in view, we provide disconnecting device for fully insulated high-voltage electrical switchgear in accordance with the invention, comprising two disconnecting contact members of a pair of partial disconnect lengths combined into a double disconnect location and which are displacable individually in and out of the disconnect location.

In accordance with a further feature of the invention, a grounding device is connected by a flange to a flanged opening formed in the casing of the device and is electrically connected to a middle portion of the device wherein the contact members are located. When the grounding device is removed, test voltages can be introduced through the flanged opening or special measuring device can be flanged to the flange of the opening.

In accordance with a still further feature of the invention, the device is provided with a casing having a free flange thereon through which test voltages can be applied to the middle portion of the disconnecting device or to which measuring devices can be flanged.

A disconnecting device of the aforementioned type, furnished with individually displaceable or adjustable contact members, offers many advantages. For example, residual charges of parts of the device which were disconnected by means of the disconnecting device at the existing voltage are conducted to ground through a partial disconnecting length or gap, which is to be closed, and through the grounded middle portion of the disconnecting device. In addition, portions of the device, for example, a cable extending therefrom can be effectively grounded through the grounding device at the middle portion of the disconnecting device so that a special cable grounding member can be dispensed with.

High-voltage tests at the parts of the device can be effected individually, starting from the middle portion of the disconnecting device, for example for a cable terminal with direct voltage and/or the remaining portions of the device with alternating and impulse voltage. The portions of the device which are not to be included in the voltage need not be unflanged or disconnected, as is necessary in the heretofore known devices of this general type; they are adequately disconnected from he portion of the device which is to be tested by means of the effective partial disconnect length or gap. The introduction of the test voltage can be effected either with a special device or through the flange of the grounding device.

In accordance with a further feature of the invention, a special shielded measuring device for measuring the partial discharge is connected to the middle portion of the disconnecting device of our invention. This provides the possibility of testing the device as to its effective insulation, the casing of the device serving as the shielding means for the measuring device.

With the aid of the disconnecting device of our invention, the cable side of the device is disconnectable in a relatively simple manner, for example, for high frequency measuring.

Other features which are considered as characteristic for the invention are set forth in the appended claims.

Although the invention is illustrated and described herein as embodied in disconnecting device for fully insulated high-voltage electrical switchgear, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments of a single figure, which shows diagrammatically and in longitudinal section the disconnecting device of our invention.

Referring now to the drawing, there is shown a high-voltage disconnecting device having a casing 1 at ground potential and containing in the interior thereof a middle portion 1' in which there are disclosed two displaceable contact members 4 and 5. The middle portion 1' is capable of being grounded with the aid of the grounding device 12. Adjacent the casing 1 and coaxially aligned therewith are two additional casings 2 and 3 in which there are respectively contained fixed contact members 10 and 11 which form with the movable contact members 4 and 5 the partial disconnect lengths 4/10 and 5/11, respectively. The drive or actuation of he displacable contact members 4 and 5 is effected by a shaft 7 through a pair of cranks 8 and 9. The coupling (not illustrated in the drawing) is disposed on the shaft 7 by means of which and in accordance with the demand one or the other of the cranks 8 and 9 or both of them can be actuated simultaneously. Constructions of this type are well known to the man of ordinary skill in the art and it is believed that further illustration and description thereof are unnecessary. It is obvious, of course, that one or the other displaceable contact member 4 or 5 or both contact members 4 and 5 simultaneously can be made to travel into the disconnect position, as shown in the FIGURE. The middle portion 1' is supported in the interior of the casing 1 by an insulating member 6, and the fixed contact members 10 and 11 are supported by similar insulating members 13, only one of which is shown in the FIGURE.

The advantages derived from the capability of separately and individually disconnecting the displaceable contact members 4 nd 5 should be apparent from the following. If, for example, the portion I of the device (partially shown on the left-hand side of the FIGURE) is to be disconnected, then both partial disconnect lengths 4/10 and 5/11 are opened or broken by suitably actuating he cranks 8 and 9 through the drive shaft 7, and the middle portion 1' of the disconnecting device is grounded by means of the grounding device 12. A trouble-free disconnect location of the type prescribed for example by the bureau of electrical standards such as the VDE in Germany, is thereby produced. However, the partial disconnect length 4/10, for example, can remain closed or can again be closed, so that residual charges on the portion I of the device located at the left-hand side of the FIGURE, which portion is to be disconnected, are conducted to ground. Accordingly, a reliable grounding of the disconnected device portion I can be effected so that when a cable is involved for example, an otherwise mandatory cable grounding member can be dispensed with.

The especially advantageous capability of testing the disconnecting device of our invention with high voltage is apparent from the following. In the aforedescribed devices, high-voltage testing of the cable side, such as device portion I, for example, is effected, as is well known, with direct current voltage, whereas the remaining device portions are tested with alternating current or impulse voltages. It was necessary heretofore to disassemble the respective device portions not subjected to the test voltage in order to be able to effect the voltage testing of the remaining portions. For testing with AC or impulse voltage, the cable portion therefore had to be disassembled, and for the DC voltage testing of the cable portion, it was at least necessary to similarly deal with the portion of the device carrying the transformer. This complicated and therefore time-consuming procedure is considerably simplified by the disconnecting device of our invention because the introduction of the voltage occurs generally at the middle portion 1' of the disconnecting device. If, for example, the cable portion I of the device is to be tested with DC voltage, the partial disconnect length 4/10 leading to the cable portion I should be kept closed, and the other partial disconnect length 5/11 should be kept open. If the other portion II of the device is to be tested with AC or impulse voltage, the partial disconnect length 5/11 should then be closed and the partial disconnect length 4/10 opened.

For the voltage testing of the disconnecting device of our invention, the introduction or application of the voltage can be effected through the flange 12' after the grounding device 12 has been dismantled and removed therefrom. However, a separate flanged opening 14, suitably closed when not in use, can also be provided in the casing 1 for the specific purpose of applying the voltage to the middle portion 1 and the contact members 4 and 5. A measuring device for measuring the inner partial discharges can also be connected to the flange 12' or the just-mentioned separate flange 14, in which case the double disconnect length fulfills the same function as for testing with high voltage.

We claim:

1. In disconnecting device for fully insulated high-voltage electrical switchgear, an electrically conductive middle portion and a pair of contact members located in said middle portion and electrically connected in series with one another, and means for displacing said contact members individually through a partial disconnect gap into and out of a disconnect position so as to respectively break and make electrical contact member.

2. Disconnecting device according to claim 1, wherein said displacing means comprises a pair of crank members actuable for individually and simultaneously displacing said contact members into and out of electrical contact with fixed electrical contact members located respectively adjacent thereto.

3. Disconnecting device according o claim 1, including a tubular casing surrounding said middle portion nd spaced therefrom.

4. Disconnecting device according to claim 3, including insulating means in said casing for supporting said middle portion therewithin out of electrical contact with said casing.

5. Disconnecting device according to claim 3, including grounding means extending through said casing and electrically connected with said middle portion for grounding the same.

6. Disconnecting device according to claim 3, said casing having a flanged opening therein, and including a grounding device having a flange connectable to the flange of said opening and an electrically conductive portion extending in the flange-connected condition of the grounding device, into electrical engagement with said middle portion.

7. Disconnecting device according to claim 6, said grounding device being disconnectable from the flange of said opening so as to introduce test voltages into the device through said opening.

8. Disconnecting device according to claim 6, said grounding device being disconnectable from the flange of said opening, and means for connecting to the flange of said opening in place of said grounding device, a device for measuring a value in the interior of said casing.

9. Disconnecting device according to claim 6, including another flanged opening in said casing for applying therethrough a test voltage to said middle portion.

10. Disconnecting device according to claim 6, including another flanged opening in said casing and means for connecting to the flange of said other opening a flange of a device for measuring a value in the interior of said casing.